Patented Jan. 27, 1931

1,790,176

UNITED STATES PATENT OFFICE

FREDERICK C. STANLEY, OF FAIRFIELD, CONNECTICUT, ASSIGNOR, BY MESNE ASSIGNMENTS, TO RAYBESTOS-MANHATTAN, INC., A CORPORATION OF NEW JERSEY

FRICTION ELEMENT AND METHOD OF MAKING THE SAME

No Drawing.    Application filed March 17, 1927.   Serial No. 176,281.

This invention relates to a friction element and the method of making the same, such for instance as friction elements for friction clutches or brake linings. In the use of friction clutches and brakes, especially as applied to automobile operation, considerable trouble is experienced with what is called "chattering" of the clutch or brake. This chattering is in reality a ripple in the torque, and seems to be caused by the friction element alternately holding and failing to hold in rapid succession. It is, therefore, an object of the invention to produce a friction element, especially for clutches and brakes, which will not have this chattering effect in use even though the clutch or brake is abused.

Numerous attempts have been made to overcome this trouble, and I have found that by mixing with the asbestos fibre, of which the friction element is principally composed, certain proportions of a powdered or granular lubricant, such as graphite, and certain proportions of a powdered or granular metal, such as lead, which has a melting point below the temperatures ordinarily generated in the brake or clutch by abuse thereof, I can greatly reduce this tendency to chatter.

Ordinarily in making the friction element a mixture of the asbestos fibre, the powdered or granular lubricant and the powdered or granular metal is made in any well known manner, preferably in a beater and made into a pulp and then sheeted in the wet board machine. The friction element is cut from this sheet, saturated with a suitable binder and cured by heat in the usual manner, as by baking in an oven. In the finished article the fibres are held together by a suitable binder comprising, for example, drying oils, asphaltic binders, pitches, and the like, and the fibres may be treated with this binder either before or after felting. That is, the binder may be mixed with the mixture of the asbestos fibre, the powdered or granular lubricant and the powdered or granular metal before the friction element is formed, or the element after being being cut to shape from the felted sheet may be immersed in the binder until sufficiently impregnated. The element may then be cured by the application of heat, preferably at a temperature below the melting temperature of the metal and until the desired hardness has been secured.

Specifically I prefer to use powdered or granular graphite as the lubricant and powdered or granular metallic lead, such as the article which is known on the market as pulverized lead. It is also preferred to use them in the proportions of from about one per cent to about five per cent of the weight of the finished article for each element, as this has been found very satisfactory in practice, but we do not wish to be limited to these proportions. I am not limited to the use of graphite, as I may use magnesium oxide known as brucite, or talc, and the like. I am also not limited to the use of lead as the metallic constituent, as I can use any metal which has a melting temperature below the temperatures ordinarily generated in the clutch or brake by its hardest use, such as when these mechanisms are abused in operation. I can, therefore, use tin in place of the lead, or combinations of tin or lead with other metals, which combinations melt at temperatures below the desired temperature, such as babbitt metals, solder and the like. However, lead has been found to be very satisfactory for this purpose, and it can be purchased at a lower price than the other metals. It has beeen found in operation that the use of the metals as described also greatly reduces the scoring of the drums or other metal elements used in connection with the friction element.

Having thus set forth the nature of my invention, what I claim is:—

1. A friction element comprising a mixture of asbestos fibre, powdered or granular graphite in the proportion of from about one per cent to about five per cent by weight of the finished product, and powdered or granular lead in proportion of from about one per cent to about five per cent by weight of the finished product held together by a hardened binder.

2. A friction element comprising a mixture of asbestos fibre and a powdered or granular metal having a melting temperature below nine hundred degrees Fahrenheit, the proportion of metal being from about one per cent to about five per cent by weight of the finished product, and the materials being held together by a hardened binder.

3. A cured friction element for brakes, clutches and similar devices comprising a mixture of asbestos fibre, a powdered or granular lubricant and a powdered or granular metal having a melting temperature below the highest temperature ordinarily developed in the abuse of friction clutches, the elements being held together to give shape to the element by a hardened binder.

4. A friction element comprising a mixture of asbestos fibre, a powdered or granular lubricant and a powdered or granular metal having a melting temperature below the highest temperatures ordinarily developed in the abuse of friction clutches, the proportions of the lubricant and metal being each from about one per cent to about five per cent of the weight of the finished product, and the elements of the mixture being held together by a hardened binder.

5. A cured friction element for brakes, clutches and similar devices comprising a mixture of asbestos fibre, powdered or granular graphite and powdered or granular lead held together by a hardened binder.

6. A friction element for brakes, clutches and similar devices comprising a mixture of asbestos fibre, a powdered or granular lubricant and powdered or granular lead, held together by a hardened binder.

7. A friction element for brakes, clutches and similar devices comprising a mixture of asbestos fibre, powdered or granular graphite, and a powdered or granular metal having a melting temperature below nine hundred degrees Fahrenheit and held together by a hardened binder.

8. The method of making a friction element for brakes, clutches, and similar devices which includes mixing asbestos fibre, a powdered or granular lubricant and a powdered or granular metal having a melting point below nine hundred degrees Fahrenheit, treating with a binder capable of being hardened and curing until the desired hardness has been secured.

9. The method of making a friction element for brakes, clutches, and similar devices which comprises forming the element of a mixture including asbestos fibre, powdered or granular graphite, powdered or granular lead and a binder capable of being hardened, and then curing until the desired hardness has been secured.

10. The method of making a friction element for brakes, clutches, and similar devices which comprises forming the element of a mixture including asbestos fibre, powdered or granular graphite, powdered or granular lead and a binder capable of being hardened the proportions of graphite and lead being each from about one per cent to about five per cent of the finished product by weight, and then curing until the desired hardness has been secured.

11. The method of making a friction element for brakes, clutches, and similar devices which comprises mixing absestos fibre, a powdered or granular lubricant, and a powdered or granular metal having a melting temperature below nine hundred degrees Fahrenheit, forming the mixture into the desired shape and treating with a binder capable of being hardened, and curing until the desired hardness has been secured.

12. The method of making a friction element which comprises mixing asbestos fibre, powder or granular graphite and powdered or granular lead, the proportions of graphite and lead being each from about one per cent to about five per cent of the weight of the finished product, forming the mixture into the desired shape and treating with a binder capable of being hardened and then curing at a temperature preferably below the melting temperature of the lead until the desired hardness has been secured.

In testimony whereof I affix my signature.

FREDERICK C. STANLEY.